United States Patent [19]

Kott et al.

[11] Patent Number: 4,750,967
[45] Date of Patent: Jun. 14, 1988

[54] MOLDING A BATHTUB LINER

[76] Inventors: John T. Kott, 23786 Via Astorga, Mission Viejo, Calif. 92691; John M. Kott, 22781 Rumble Dr., Lake Forest, Calif. 92630

[21] Appl. No.: 896,527

[22] Filed: Aug. 13, 1986

Related U.S. Application Data

[63] Continuation-in-part of Ser. No. 751,129, Jul. 2, 1985, abandoned.

[51] Int. Cl.⁴ .................. B29C 51/06; B29C 51/36
[52] U.S. Cl. ............................. 156/499; 156/500; 425/110; 425/388
[58] Field of Search ................. 156/221–224, 156/499, 500; 425/110, 112, 388

[56] References Cited

U.S. PATENT DOCUMENTS

| | | | |
|---|---|---|---|
| 2,080,601 | 5/1937 | Cappuccio | 4/580 |
| 2,377,946 | 6/1945 | Leary | 425/388 |
| 2,695,256 | 11/1952 | De Olloqui et al. | 428/339 |
| 2,853,714 | 9/1958 | Darmstadt | 4/580 |
| 2,911,677 | 11/1959 | Weber | 264/547 |
| 3,039,911 | 6/1962 | Fox | 264/553 |
| 3,045,254 | 7/1962 | Cook et al. | 4/580 |
| 3,133,292 | 5/1964 | Speir | 4/580 |
| 3,163,686 | 12/1964 | Dusel et al. | 264/45.4 |
| 3,356,253 | 12/1967 | Wimmer | 220/83 |
| 3,539,416 | 11/1970 | Sanders et al. | 425/388 |
| 3,593,347 | 7/1971 | Nemiroff | 4/288 |
| 3,614,793 | 10/1971 | Nemiroff | 4/580 |
| 3,720,540 | 3/1973 | Wimmer | 428/430 |
| 3,755,522 | 8/1973 | Jope et al. | 425/388 |
| 3,931,651 | 1/1976 | Weir | 4/580 |
| 3,933,562 | 1/1976 | Curckshank et al. | 156/250 |
| 4,043,853 | 8/1977 | Saladino | 156/94 |
| 4,067,071 | 1/1978 | Altman et al. | 277/212 FB |
| 4,069,523 | 1/1978 | Ridgeway | 4/173 R |
| 4,158,585 | 6/1979 | Wright | 156/94 |
| 4,179,760 | 12/1979 | Nakagawa | 4/166 |
| 4,267,609 | 5/1981 | Altman et al. | 52/35 |
| 4,299,064 | 11/1981 | Daniels | 52/35 |

FOREIGN PATENT DOCUMENTS 2136948 2/1973 Fed. Rep. of Germany.
1021494 3/1966 United Kingdom.

Primary Examiner—Willard E. Hoag
Attorney, Agent, or Firm—Knobbe, Martens, Olson & Bear

[57] ABSTRACT

In an apparatus for forming a liner on a washbasin, in situ, with the washbasin acting as a master mold, vacuum tubes are inserted into the corners of the washbasin and connected to a portable vacuum unit. The washbasin cavity is sealed, with a sheet of unmolded liner material adhered over the washbasin cavity. A portable frame engages one surface of the liner adjacent an edge of the liner to restrain deformation of the periphery of the liner during molding. A portable heater rests on top of the frame. The frame is enclosed to form an oven to heat the liner material to the appropriate temperature, vacuum is then drawn in the washbasin cavity to mold the liner, replicating the washbasin's contour.

20 Claims, 5 Drawing Sheets

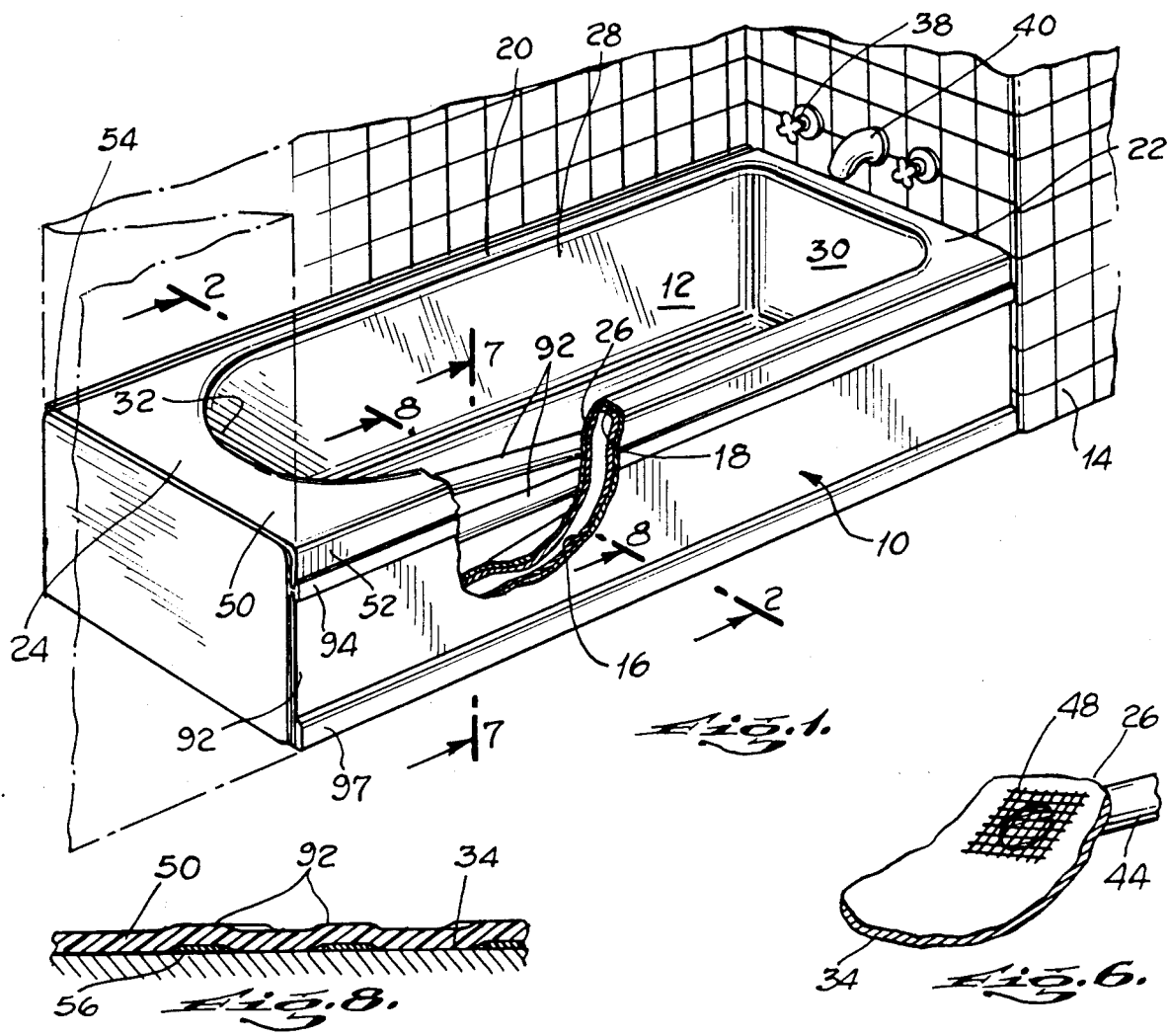
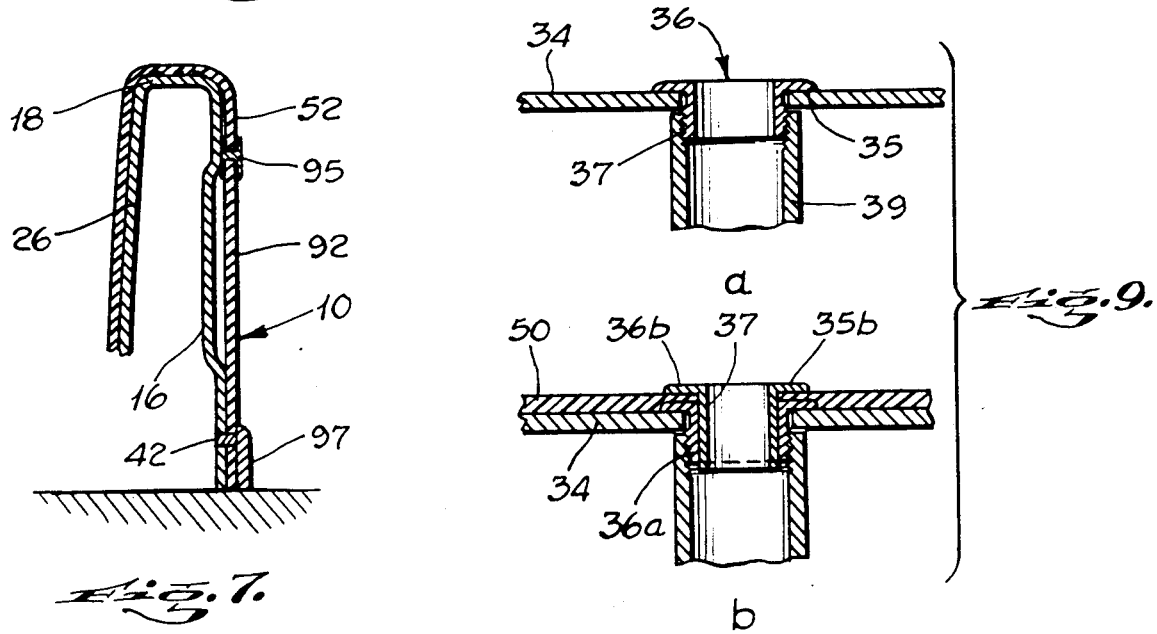

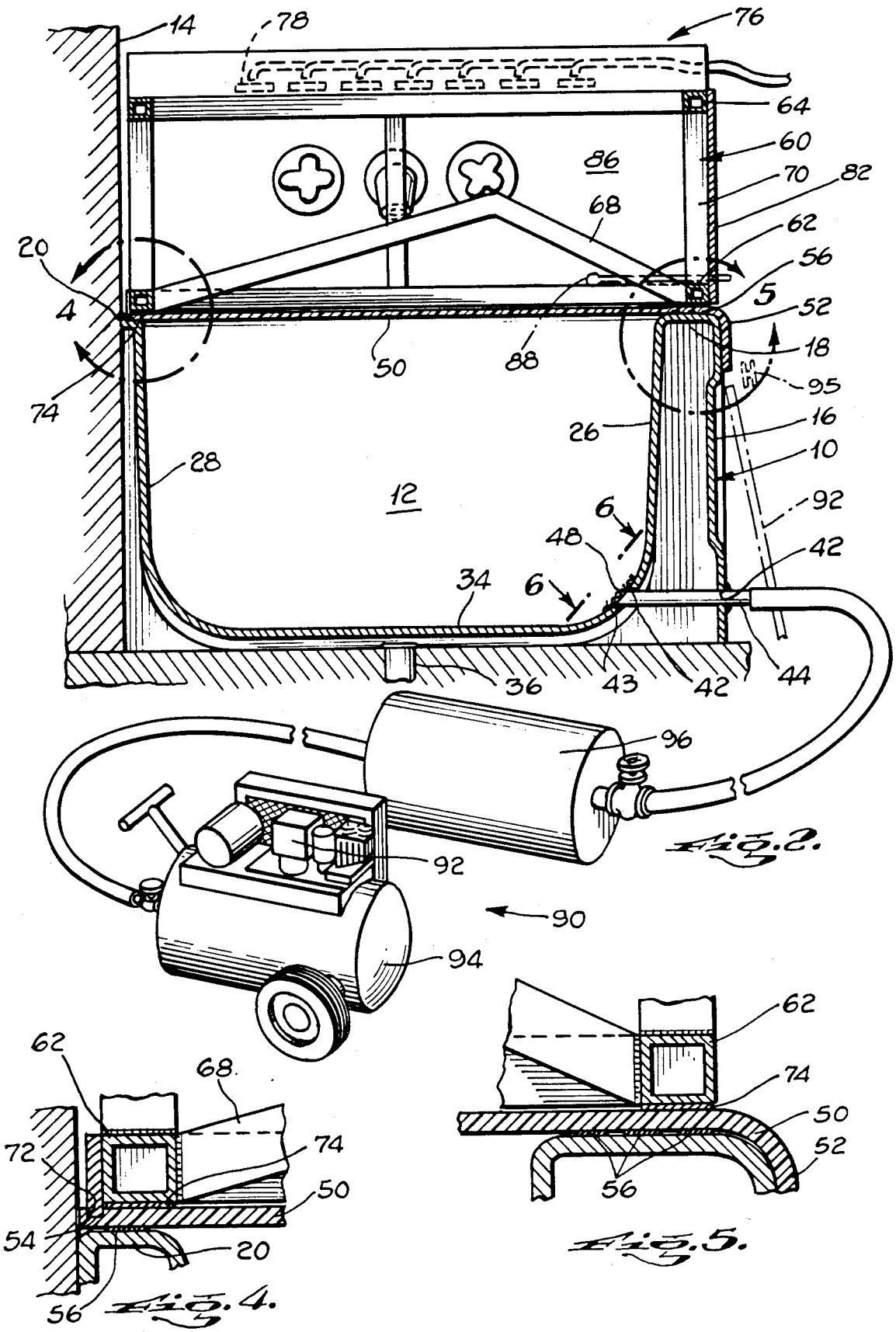

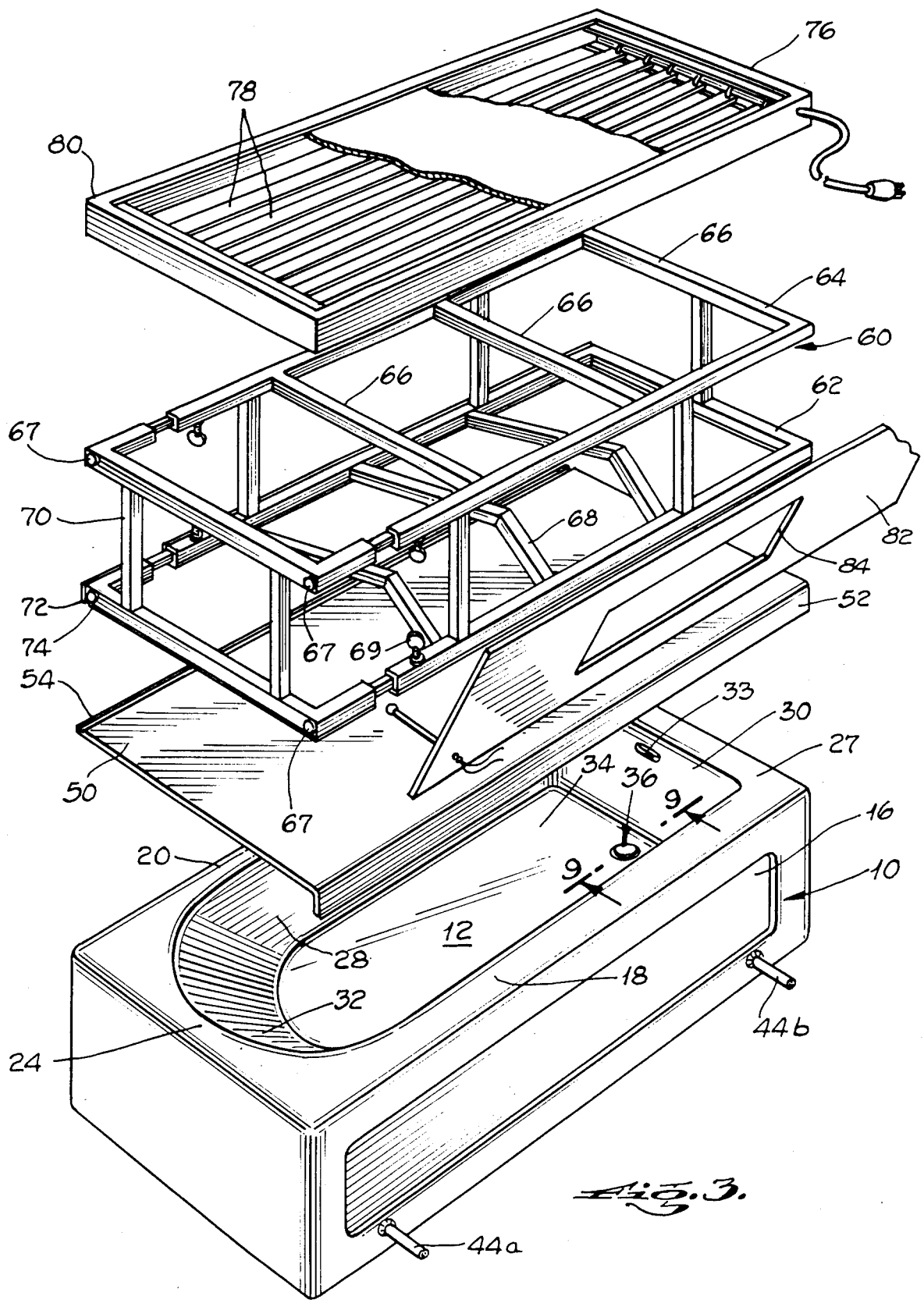

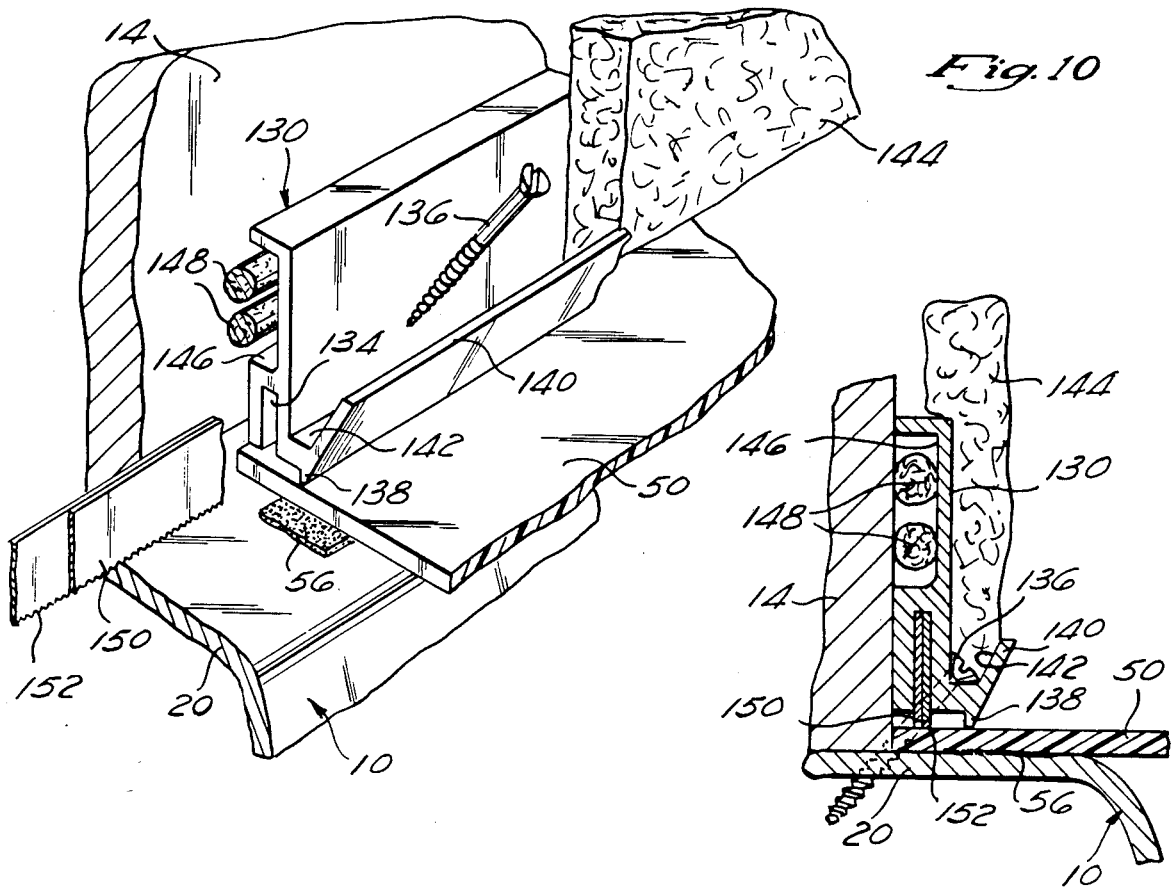
Fig. 10
Fig. 11
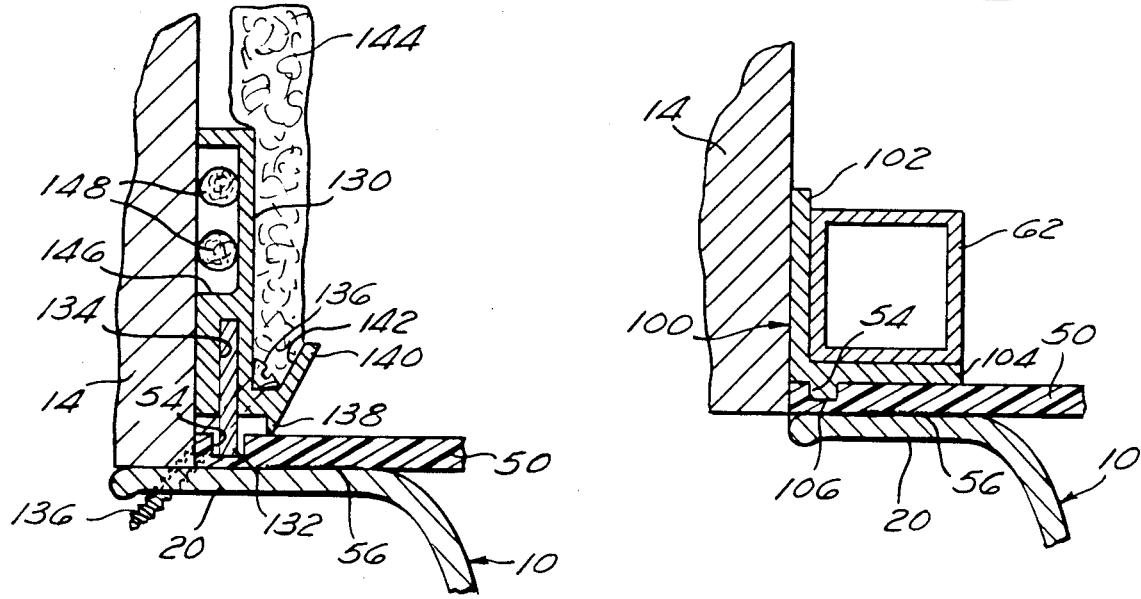
Fig. 12
Fig. 13

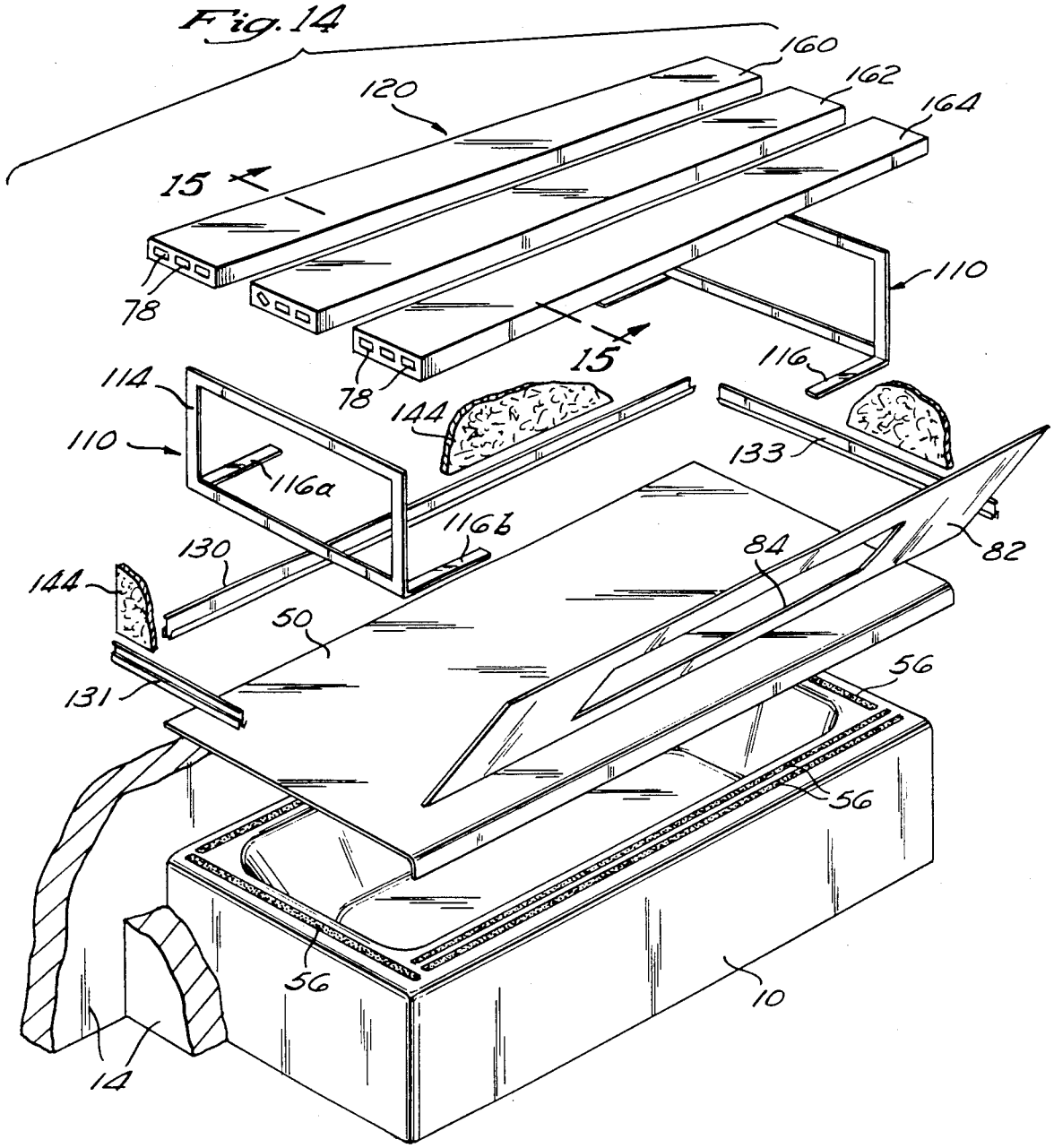
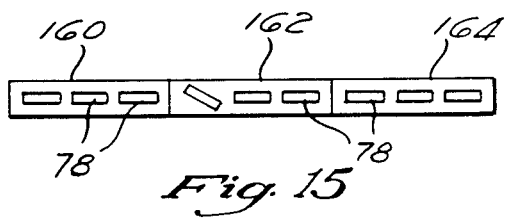

MOLDING A BATHTUB LINER

This invention relates to washbasins, such as bathtubs and the like, and more particularly to methods and apparatus for renovating the surface of these washbasins in situ. This application is a continuation in part of application Ser. No. 751,129, filed July 2, 1985 by the same inventive entity and now abandoned.

BACKGROUND OF THE INVENTION

Washbasins, such as sinks, bathtubs, showers, and the like are typically made out of cast iron with a porcelain coating. With age, the porcelain chips, cracks, or is abraded away to present a rough surface which attracts dirt and, is difficult to clean, is unsightly, and unasanitary. Further, the porcelain will change color with age or may pick up stains. These worn and damaged surfaces are not only unsightly, but are more difficult to clean than smooth, new surfaces. The debris lodged in these damaged surfaces can present a health hazard, especially in situations where a number of people use the same washbasins.

Washbasins such as bathtubs, are typically located in bathrooms or restrooms having very restricted space and access. Kitchen sinks often are built into cabinets and tiled into place, so that removal of the sink destroys the tile. Further, many of the washbasins, especially bathtubs, are very heavy and bulky, further complicating any attempt at replacement. Thus, it is often impractical to entirely remove the washbasin for replacement, or even refinishing of the surface.

As a result of this restricted access and immobility, several methods have been developed to refinish the surfaces of these washbasins. One such method applies a filler material to smooth out the washbasin surface, followed by a coating of paint or a reapplication of porcelain to the surface. Unfortunately, such treatments often provide only temporary results with resurfacing being again required within a few years. Further, a considerable amount of time may be required for the filler material to properly set, and more time for the surface coat, or paint, to dry. The washbasin is unuseable during this time.

Several prior art U.S. patents describe various methods for putting a pre-formed plastic liner over an existing washbasin surface. For example, U.S. Pat. No. 4,158,585 to Wright, discloses a method for forming a plug from a bathtub, using that plug to form a master mold, forming a liner from the master mold, and then adhering the liner to the bathtub. However, the Wright process requires a considerable amount of time as well as multiple and complex steps in order to resurface the washbasin. Further, the formation of the liner envisions the use of factory equipment to form a master mold from the plug, and to draw the vacuum to form the liner.

The factory molding of such liners is usually required. For bathtubs, the large area and deep draw requires a large vacuum requiring factory equipment. For sinks, the area is smaller, but a deep draw is still required, and the shape is often complex, as in double kitchen sinks. Again, high vacuum capacity equipment is required. Draw molding of liners is also possible, but the high press forces still mandate a factory environment and safety precautions.

The use of such factory equipment inherently requires delays in transporting goods between the home and the factory, thereby increasing transportation costs. Still further, the factory vacuum equipment used to form the liner requires a very bulky and large capacity vacuum pump, which is costly, heavy, and generally immovable. The radiant heaters used to melt the plastic are typically very high amperage heaters requiring expensive and bulky electrical installations and power sources, as well as multiple safety code inspections and approvals. If a high power electrical source is not available, a sufficiently large generator can sometimes be temporarily obtained, however, such generators cost several hundred dollars a day to rent, are as large as a truck, have power cables as thick as your wrist (for the high power), and are generally impractical for use in a home environment.

There is such a variety in the styles, sizes, and shapes of washbasins that the plug and master mold as used in Wright, will typically not be usable on another washbasin. To the extent there are some repeated sizes and styles of washbasins, it is prohibitive from a cost and space viewpoint to inventory all of the master molds for the washbasins.

Additionally, the use of preformed liners, or liners formed through an intermediate plug and mold process, never exactly fit the actual washbasin onto which they are installed. Thus, there is typically a gap between the replacement liner and the original washbasin surface. If sufficiently large, mold can form in this gap. Adhesives are often required to be injected into this gap in order to fill the gap and restrain the slippage between the liner and the washbasin. These adhesives can take a considerable amount of time to dry or set. During this time, the washbasin is often unusable.

There is thus a need for a washbasin liner which can be installed quickly, to reduce the time in which the washbasin is not usable. Further, it is desirable to have the liner formed to the exact shape of the washbasin itself, rather than being formed on an intermediate mold, or a different washbasin, each of which may be of slightly different size or shape. Ideally, the liner would be formed on the washbasin in situ.

The prior art devices all envision factory molding devices involved heavy and bulky clamping fixtures and required large forces, because the molds were heavy and bulky, because the vacuum equipment was very large, bulky, and requires large pumps, and because the heaters operated at extremely high temperature, and required very high electrical currents.

In short, the prior art devices and methods required the space, safety, and permanent fixtures suitable only for industrial environments. There is presently no known, or appropriate way to mold a washbasin liner with the washbasin still in the bathroom environment. The unwieldly fixtures, the high forces, the dangerous operating voltages, and the high temperatures of commercial devices, are so unworkable in a bathroom environment as to make the mere idea of in situ molding appear not only unworkable, but ludicrous. Laughter was the initial response to initial inquiries on implementing this idea, from sources familiar with plastic molding.

If the idea of in situ liner molding seemed unbelievably funny, implementing that idea was not. Draw molding was attempted, but the draw mold cooled the pliable liner unless the mold was heated, thus giving a poor draw. Heating the mold seemed impractical. The fixtures to support the forces was unwieldly. The molding forces soon reached the point where the bathroom walls and floor were in danger of breaking during molding.

Vacuum molding was tried, but the edges of the liner deformed. A lip over one edge restrained that edge, but the typical bathtub is enclosed on three sides so as to preclude restraining lips on those sides. A clamping fixture was tried, but again, the required clamp force threatened to punch out the walls and the floor.

The "portable" vacuum pump lacked sufficient suction to mold the liner before it hardened. A larger pump became non-portable. Connecting the vacuum pump to the washbasin was awkward for sinks, since the drains were often accessible. However, that connection was not typically available for bathtubs since access holes to the drains are typically not provided. Tearing up the flooring was destructive and time consuming.

There was not enough space in the bathroom to heat the liner first, then place it on the washbasin and mold it, so the liner had to be heated in place. Unfortunately, it is hard to heat plastic from one side—it bows up to contact the heaters. Moving the heaters far enough away to avoid the bowed liner reduces the heater efficiency, and subjects the bathroom walls to potentially damaging temperatures. Slow heating of the liner at very low temperatures was tried, but the plastic can be over baked, making it unsuitable to mold.

Powering the resistive heaters appeared impossibly unportable. The high power required by the heaters far exceeded what was available, or safely usable in a bathroom—a dripping faucet could be fatal. A "portable" generator was tried, but it not only required a truck to move it, but the electrical cords were too heavy to readily move: copper conductor the size of your wrist is very heavy.

Fastening the liner to the washbasin required a vacuum seal, that could not only survive the molding temperatures, but could accommodate the thermal expansion of the liner as it heated. Hand adhesives cracked and broke. The colder, immovable washbasin not only exacerbated the thermal expansion problems, but limited the possible adhesive materials which could be used with the typically porcelain coated washbasins.

In short, attempts to implement the idea of in situ molding supported the prior view that such molding could not be done.

SUMMARY OF THE INVENTION

This invention allows a liner to be formed in situ, on the actual washbasin to which the liner is attached. In short, the actual washbasin serves as a master mold, so that a plastic sheet, heated to a sufficiently pliable temperature, can be vacuum formed onto the washbasin. A portable fixture or frame prevents the periphery of the plastic sheet from deforming during the vacuum molding. A portable heater provides the heat to soften the plastic to a sufficiently pliable state, and to preheat heat the washbasin. A portable vacuum unit (pump and tanks) provides the vacuum forming pressure. The pump can also provide the cool air to set the plastic after it has been formed.

The fidelity with which the liner of this invention replicates the surface of the washbasin is so great that the cracks, gouges and irregularities in the surface are preferably first smoothed by appropriate filler methods. At least one evacuation hole is then drilled through an external, accessible side of the washbasin and on through the surface to be lined with plastic. The hole is drilled toward the corner of the washbasin. A screen is placed over this hole. A vacuum can then be drawn through an evacuation tube inserted through the hole, and sealed to the surface to be lined.

A sheet of suitable plastic is then placed on top of the washbasin and cut to size so that it abuts the edges of the walls which typically surround the washbasin. The plastic sheet usually extends over the edge of the washbasin on the side which is externally accessible. This extended edge, or lip, helps to restrain that peripheral edge from deforming as the plastic liner is molded onto the washbasin.

A groove is then cut along the external edge of the plastic sheet adjacent the longest, internal edge of the sheet. This edge corresponds to the long side of the washbasin, such as a bathtub, adjacent the wall. This groove cooperates with a frame to restrain deformation of this edge as the plastic sheet is molded to form a liner. Additional edges can be grooved and restrained, as needed.

A flexible adhesive material is placed along the periphery of the washbasin, so that it adheres to the plastic sheet which is placed over the washbasin. The adhesive forms an air tight seal between the surface of the washbasin and the plastic sheet to form a substantially air tight cavity. The adhesive also serves to restrain the periphery of the plastic from deforming as the sheet is molded to form a liner. If desired, adhesive can be placed elsewhere, such as on the bottom of the washbasin.

After adhering the plastic sheet to the periphery of the washbasin, a frame is placed on the external surface of the plastic sheet, the shape of the frame generally coinciding with that of the washbasin. At least one edge of the frame has a depending protrusion which fits into the groove along the edge of the plastic sheet. This frame helps restrain the peripheral edges of the plastic from deforming as the plastic sheet is molded to form the liner.

A radiant heater is placed on the frame such that the frame locates the heater at a predetermined distance from the surface of the plastic sheet. The weight of the heater on the frame further helps restrain the periphery of the sheet from deforming during molding. If required, any bathroom fixtures can be insulated, as can the exposed wall surfaces adjacent the heater and the plastic sheet. A panel is then placed on the open sides of the frame. The panel, washbasin, heater, and the walls surrounding the washbasin, form an enclosure containing the plastic sheet. The enclosure acts as an oven to heat the plastic, and also preheat the washbasin.

The plastic is heated in this enclosure until it reaches a sufficiently pliable state. The melting of the plastic temperature is typically fairly low around 300°-350° F., so the pliable temperature is also low. The heating is done slowly to allow the use of a portable, low amperage, low temperature heater, to allow preheating of the washbasin, and to allow uniform heating through the thickness of the plastic sheet.

When the plastic sheet reaches its melting temperature, a vacuum is quickly drawn between the plastic sheet and the washbasin, through the use of the evacuation tube. The vacuum deforms the plastic to replicate the surface of the washbasin. A portable vacuum pump is used in conjunction with a sufficient capacity, portable vacuum tank to provide a portable vacuum system with sufficient suction.

Once the washbasin contour is completely duplicated, cool air is blown on the plastic liner to cool it.

The vacuum pump can be used to provide the air to cool the formed liner.

In an alternate embodiment, a member having a member having a generally L-shaped cross section is placed on the plastic sheet, over the groove. A depending protrusion is placed on the member so that it engages and cooperates with the groove to restrain the periphery of the plastic sheet from unacceptable deformation during molding. The depending lip is removed from the frame, and the frame sets in the L-shaped portion of the member.

In another embodiment of the invention, the frame comprises two lightweight, portable end brackets which rest on top of the plastic sheet, and support the radiant heaters above that sheet. A holding bracket having a depending lip, is removably fastened to the bathroom wall so that the depending lip cooperates with the groove in the plastic sheet in order to maintain the periphery of the plastic sheet during molding.

Thermal insulation blankets are placed along the walls immediately adjacent the wash basin. The holding bracket has a channel into which the bottom of the insulation blankets fit. The holding bracket also has a cavity opening onto the wall to which the bracket is fastened. Absorbent material such as cotton cord is placed in this cavity so that it contacts the walls along the length of the bracket. Any moisture which condenses and flows down the walls between the walls and the thermal insulation blanket, will thus be either absorbed by the absorbing material, or contained in the channel.

A depending portion of the channel on the holding bracket also extends downward to where it contacts the liner so as to stabilize the holding bracket, and serve as a heat shield for the outer periphery of the liner along the bracket. The depending portion of the channel does not extend as far from the holding bracket as does the depending lip on the holding bracket, as it extends only to contact the plastic sheet, and does not extend into the groove in the sheet as does the depending lip on the holding bracket.

In yet another embodiment of this invention, the depending lip on the above described holding bracket takes the form of a dependent projection having a serrated edge. In this embodiment, no groove need be cut into the edge of the plastic sheet. Rather, the serrated edge grips the plastic sheet to restrain it during molding. In this embodiment, the depending portion of the channel extends substantially the same distance from the holding bracket as does the serrated edge.

BRIEF DESCRIPTION OF THE DRAWINGS

The foregoing and other features and advantages of the invention will be more apparent from the following description of one particular, preferred embodiment of the invention, as illustrated in the accompanying drawings.

FIG. 1 is a perspective view of an installed liner of this invention;

FIG. 2 is a cross-sectional view taken along 2—2 of FIG. 1;

FIG. 3 is an exploded perspective view of the apparatus of this invention;

FIG. 4 is a cross-sectional view taken from FIG. 2;

FIG. 5 is a cross-sectional view taken from FIG. 2;

FIG. 6 is a perspective view taken from FIG. 3, showing the vacuum tube connection to the cavity of the washbasin;

FIG. 7 is a cross-sectional view taken along 7—7 of FIG. 3, showing a cosmetic cover on the side of the washbasin;

FIG. 8 is a cross-sectional view taken along 8—8 of FIG. 1, showing the formation of anti-skid, raised portions in the bottom of the liner of this invention; and FIG. 9 is a cross sectional view of the drain;

FIG. 10 shows an apparatus for stabilizing the periphery of the liner during molding;

FIG. 11 shows a cross sectional view of embodiment of FIG. 10 for stabilizing the periphery of the liner during molding;

FIG. 12 shows another embodiment for stabilizing the periphery of the liner during molding;

FIG. 13 shows an alternate embodiment of this invention;

FIG. 14 is an exploded perspective of this invention; and

FIG. 15 is a cross-sectional view along 15—15 of FIG. 14, showing an alternate embodiment of the heaters.

DETAILED DESCRIPTION OF THE PREFERRED EMBODIMENT

Very briefly described, the apparatus as shown in FIG. 2 comprises a portable heating unit 76 and a portable vacuum unit 90, which are used in conjunction with a portable frame 60, so that a liner 50 can be vacuum molded in situ using the washbasin itself as a master mold.

Referring to FIG. 1 there is shown a washbasin, such as a kitchen sink, or preferably a bathtub 10, which has a generally rectangular shape with a sharp defile, such as cavity 12, located therein. Typically, the bathtubs 10 are placed in corners or ends of bathrooms so that three sides of the bathtub 10 are surrounded by a structure such as walls 14. The remaining, long side 16 of bathtub 10 is accessible and allows ingress and egress to the cavity 12 in the bathtub 10.

The bathtub 10 typically has a top edge 18 adjacent the side 16. Opposite the edge 18, and adjacent the wall 14, is a narrower, interior edge 20. Generally perpendicular to the edges 18 and 20, are located end edges 22 and 24.

Referring to FIGS. 1 and 2, the inside of the bathtub 10 comprises a side wall 26 connected to, and adjacent the top edge 18. Opposite the side wall 26, and generally parallel thereto, is located side wall 28. The side wall 28 is contiguous to the interior edge 20.

Ends 30 and 32 (FIG. 4) are located generally perpendicular to, and between the side walls 26 and 28. A bottom 34 (FIG. 2) is contiguous with the side walls 26 and 28, and the ends 30 and 32. Thus, the cavity 12 is bounded by the bottom 34, the side walls 26 and 28, and the ends 30 and 32.

Referring to FIG. 2, a connection is formed with the cavity 12 which enables the cavity 12 to be evacuated. A hole or aperture 42 is formed through the sides 16 and 26 of the bathtub 10. The hole 42 can be drilled, and is preferably located at a corner of the bathtub 10, adjacent the bottom 34 and end 30 of the bathtub 10. An evacuation tube 44 is placed through the hole 42 such that it does not protrude inside the cavity 12, but extends outside of the side 16 so as to be externally accessible. A filler material 43 is placed around the end of the evacuation tube 44 adjacent the cavity 12, so as to form a smooth surface and an airtight seal between the hole 42 and the evacuation tube 44. A sealing material 45 such as the filler material previously mentioned, is also applied as needed to seal the evacuation tube 44 to the hole 42 in the side 16. Thus, the evacuation tube 44 provides an airtight connection, or communication path between the cavity 12 and the exterior of the bathtub 10.

It is believed that one evacuation tube 44 is sufficient for the purposes of this invention. However, the preferred embodiment uses two evacuation tube 44a and 44b (FIG. 3), located adjacent opposite ends of the bathtub 10. Tubes ⅜ inches in diameter, and located at the bottom 34, and about 4 inches from the ends 30 and 32, respectively, have been found suitable. A larger diameter tube could be used to allow a faster molding rate.

It is important that the evacuation tubes 44 be located adjacent the ends 30 and 32 of the bathtub 10. Attempts to mold the liner 50 using evacuation tubes 44 located about 10 inches from ends 30 and 32, were not successful and resulted in incomplete replication of the bathtub 10 by the liner 50.

It is also believed important that the holes 42 be located adjacent the bottom 34, since the bottom is the last part of the bathtub 10 to be replicated during molding. Still further, the bottom corners are the last portion of the bathtub 10 to be molded, and the location of the evacuation tubes 44, as described above, is preferably in these corners.

It is possible to use a drain 36 or overflow 33 to draw the vacuum to mold the liner 50. However, in most instances, it is very difficult to access the drain 36 or overflow 33 without cutting holes in the walls 14 or flooring. Thus, the use of evacuation tubes 44 is preferred.

Referring to FIGS. 2 and 6, a wire mesh or screen 48, such as is typically used on house screens, is placed over the hole 42 opening into the cavity 12. The screen 48 serves to prevent the liner 50 (FIG. 2) from being drawn within the evacuation tube 44 during molding. A screen having approximately 1/32 inch spacing between the wire mesh, as is generally found on common house screens, has been found suitable. A wider mesh spacing runs the risk of having indentations, corresponding to the mesh density, show through the liner 50 after molding.

Referring to FIGS. 5 and 3, on the bottom 34 adjacent the end 30 is located a drain 36 (FIG. 3). There are typically fixtures, such as faucets 38 (FIG. 1) and water spout 40 (FIG. 1) located on the wall 14 adjacent the end 30. The surface of the bathtub 10 is first smoothed by filling with appropriate filler materials or putties which are well-known in the art and not described herein. The surface preparation need not present a visually attractive surface, only a smooth surface. The hole 42 and its covering screen 48 (FIG. 2) are not covered by the filler material 43, although any rough edges around the hole 42 can be smoothed.

Any apertures to the cavity 12 in the bathtub 10 are covered with a removable airtight seal, by using putty or other sealing materials well-known in the art. Thus, drain 36, and overflow aperture 33 are also sealed.

Referring to FIGS. 2 and 3, a plastic sheet, or liner 50 is cut to fit over the top of the bathtub 10. The liner 50 can be of various moldable materials such as thermoplastic. It has been found suitable to use a 0.220 inch thick ABS, high impact thermoplastic, coextruded with a 30 mm thick clear DR acrylic. The DR Acrylic is locating so that it is the exposed surface of the liner after molding. The use of 0.250 inch thick PVC is also believed suitable.

For appearance purposes, as well as structural reasons described hereinafter, it is preferred that the liner 50 be cut to cover the top edges 18, 20, 22, and 24, and to fit against the surrounding walls 14 (FIGS. 1 and 2). The edge of the liner 50 adjacent the side wall 16 is preferably preformed to curve at least slightly downward over the top edge 18 along the side 16 and form a depending lip 52. The edge of the liner 50 adjacent the interior edge 20 is preferably cut to length so that the depending lip 52 snugly contacts the side 16.

Referring also to FIG. 4, when the liner 50 is cut to size, a groove 54 is cut or routed in the external surface adjacent the edges of the liner 50. Preferably, the groove 54 is cut only along the edge adjacent the interior edge 20 of bathtub 10. This edge corresponds to the longest, unsupported edge of the liner 50. It is possible, however, to place the groove 54 on other edges, for example, the end edges 22 and 24 (FIGS. 1 and 2). The groove 54 is preferably as close to the edge of the liner 50 as possible, while still provide structural support to prevent tearing out of the edge of the liner 50 during molding. A groove ¼ inch wide, ⅛ inch deep and ending within about ⅛ inch of the edge of liner 50, has been found suitable.

Referring to FIGS. 4 and 5, while the liner 50 is removed from the bathtub 10, an adhesive 56 is placed on the edges 18, 20, 22, and 24 (FIG. 1). The adhesive 56 is preferably flexible enough to withstand the forces exerted by the thermal expansion and contraction of the liner 50 during molding. If the adhesive 56 is too thin or not flexible enough, it will break during heating or during molding. Further, adhesive 56 must be compatible with the molding temperatures experienced during the molding of the liner 50.

A double-side adhesive tape, 1 inch wide and having a ⅛ inch thickness, with closed cell foam between the adhesive layers, has been found suitable in practice. Such an adhesive tape can be purchased from MAC-TAC Corporation. It is commonly available in width of one (1) inch. If the tape is much thinner than ⅛ inch, it looses some of the flexibility needed to accommodate thermal expansion of the liner 50, and also does not form as good a vacuum seal. If the tape is significantly thicker, then it begins to leave impressions in the molded liner 50.

As illustrated in FIG. 4, the adhesive 56 which is placed on the edge 20, extends from the wall 14, to the vertical projection of the side wall 28, and ends 30 and 32. The edges 22 and 24 are adhered the same as edge 20. The adhesive 56 is cut so the effective tapering of the end of the adhesive 56 with respect to the side wall 28 and ends 30 and 32, provides a smooth surface so as to minimize distortion of the molded liner 50. This smooth transition is not believed to be necessary on the top edge 18, due to the extra width of that edge, and the better fixation or restraint of that edge during molding.

A single strip of the adhesive 56 on the edges 20, 22, and 24 is believed sufficient. However, multiple strips of the adhesive 56 are placed on the top edge 18, to effectively cover the surface of that edge. The adhesive 56 is applied in such a manner to form an effective air tight seal between the bathtub 10 and the liner 50. Thus, gaps between the adhesive 56 should be avoided because the flexibility of the plastic to seal off the gap during molding, is unpredictable.

Referring to FIGS. 2 and 3, after applying the adhesive 56, the liner 50 is placed in position over the bathtub 10 and sealed against the adhesive 56 (FIG. 1). A frame 60 is placed on top of the liner 50 to help restrain the periphery of the liner 50 during molding.

The shape of the frame 60 is generally rectangular, with the shape and width corresponding to the size and shape of the bathtub 10. In more detail, there is a lower, horizontal, rectangular frame 62 which is generally parallel to, and adjacent the unmolded liner 50. A generally rectangular, upper frame 64, is vertically spaced apart from, but parallel to, the lower frame 62 and the unmolded liner 50. The upper frame 64 has cross members 66 to make the upper frame 64 more rigid within the plane of the frame 64. The lower frame 62 has generally bowed cross members 68, to stabilize the lower frame 62. The bowed cross members 68 are curved, bowed, or angled away from the liner 50. As the liner 50 is heated, it expands and bows upward toward the bowed cross members 68. The bowing or angling of the cross members 68 prevents contact with the heated and bowed liner 50.

FIG. 2, it has been found preferable to use an asymmetrical construction such that the bowed cross member 68 is formed of two cross members, of unequal length, which join at a point above the liner 50. Thus, the apex of the bowed cross members 68 is not located over the center of the bathtub 10, but is asymmetrically located towards one side, preferably the exterior side 16.

This asymmetrical shape helps prevent the formation of cold spots in the center of the liner 50 during heating. Shifting the apex of the bowed cross member 68 towards one side of the frame 60, helps shift those cold spots towards the periphery of the liner 50 where their effect is not as noticeable since that portion of the liner 50 need not be as pliable as the central portion. Further, the bowing of the cross members 68 places the apex further above the liner 50 and thereby reduces the effect of any cold spot on the liner 50 caused by the cross members 68. The asymmetrically bowed cross member 68 also provides a convenient hand hold adjacent the more accessible side of the frame 60.

Referring again to FIGS. 2 and 3, vertical members or supports 70 connect the lower frame 62 to the upper frame 64. The length of the frames 62 and 64 can be adjusted, as by thumbscrews 69, to accommodate varying lengths of bathtub 10. Further, the length of the vertical members 70 can be similarly varied (not shown) to adjust the distance of a heater 76 from the liner 50. Finally, the width of both the upper frame 64 and the lower frame 62 can be varied similarly (not shown) to adjust for the width of the bathtub 10.

It can thus be seen that the upper and lower frames, 62 and 64 respectively, the cross members 66 and 68, and the vertical members 70, are connected to form a rectangular, box-like framework 60 having the same general shape as the bathtub 10. The dimensions of the frame 60 are adjustable. The frame 60 is thus a lightweight, adjustable, portable frame.

Referring to FIG. 3, there are shown friction means such as rubber pads 67 located on the ends of the frame 60 above the ends 24 and 30 of the bathtub 10. The pads 67 are preferably made of silicone rubber. The length of the frames 62 and 64 is adjusted by use of thumbscrews 69 so that the pads 67 frictionally engage the adjacent walls 14 (FIG. 1). This frictional engagement helps prevent the frame 60 from sliding during molding of the liner 50.

Referring to FIG. 4, the side of the lower frame 62 which is placed adjacent the groove 54 in the liner 50, has a depending protrusion or lip 72. The lip 72 can be formed by welding or riveting a metal strap on the side of the lower frame 62, so that the metal strap protrudes over the end of the lower frame 62, to form the lip 72. the lip corresponds in size and location to the groove 54 which is preferably placed adjacent the interior edge 20 of the bathtub 10, although, as mentioned, the groove 54 can be placed on other edges of the liner 50. Thus, the lip 72 is preferably a continuous strip having a width of approximately ¼ inch, and extending below the surface of the lower frame 62 by a distance of approximately ½ inch.

A bumper strip 74 (FIGS. 2 and 3) can be placed adjacent the edges of the frame 60 which are adjacent the liner 50. The bumper strip 74 serves to prevent the metal frame 60 from gouging or damaging liner 50 during molding. Thus, the bumper strip 74 is preferably made of a resilient material such as one of the various elastomers. A single sided adhesive tape, similar to that of adhesive 56 is suitable for the bumper strip 74.

Referring to FIGS. 1, 2, and 3, the frame 60 serves to restrain the periphery of the liner 50 from undesired deformation as the liner 50 is molded. In effect, the restraining lip 72 cooperates with groove 52 to provide the required rigidity to the edge of the liner 50 so that edge retains the desired configuration when molded. The frame 60 achieves an effective restraint, while still being portable, as required for an in situ molding.

Previous vacuum molding devices used permanently installed, factory equipment to restrain the edges of the plastic sheet being molded. Since the fixtures were permanently installed, there was no problem in getting a strong enough structure, or providing enough force on the mold to restrain the periphery of the material being molded. Such fixtures are, however, too bulky and heavy for use in a household bathroom. Indeed, the proclivity to surround bathtubs by three walls extremely limits the manner of restraining the periphery of the liner 50, and also limits the amount of force which can be exerted on the bathtub 10. The frame 60 serves to restrain the periphery of the liner 50 without exerting pressure against the walls 14. Thus, there is no danger of structurally damaging the walls 14 as would be the case if the walls 14 (FIGS. 1 and 2) were used as a support from which to apply a clamping pressure to the liner 50.

The use of adhesives 56 (FIG. 2) between the bathtub 10 and the liner 50 is insufficient to restrain the periphery of the liner 50 during molding. Forming the depending lip 52, and cutting the liner 50 so that the depending lip 52 abuts against the edge of the side 16 of the bathtub 10, does serve to effectively restrain the portion of the liner 50 adjacent the lip 52 during molding.

However, the remaining edges of the liner 50 are not effectively restrained. The walls 14 prevent a depending lip, and do not allow sufficient width on the edges 20, 22 and 24 to restrain the deformation of those edges during modling. In short, the edges of the liner 50 are so close to the defile, or cavity 12 that the edges lack sufficient rigidity to maintain a desired shape as the liner 50 is molded.

The weight of the frame 60 and heater 76 (FIGS. 2 and 3) does help to clamp the liner 50 against the bathtub 10 and thus does help to restrain peripheral deformation of the liner 50 during molding. However, the weight of the frame 60 and heater 10 could not be safely increased to provide sufficient clamping pressure, since increasing the weight greatly hinders the portability of the device as is required for in situ molding in a bathroom. Further, sufficient weight to effectively clamp the liner 50 against the bathtub 10 raises the possibility of breaking the flooring beneath the bathtub 10.

The groove 54 cooperating with the depending lip 72 (FIG. 4) on a portable frame 60 provides an effective in situ clamping apparatus. The frame 60 is heavy enough to provide some clamping pressure to help restrain the periphery of the liner 50 during molding. The depending lip 72 cooperates with the bottom and sidewall of the groove 54 to restrain deformation of the grooved edge of the liner 50. Thus the lip 72 and groove 54, and the depending lip 52, serve to restrain the longest edges of the liner 50 during molding. The shorter edges of the liner 50, adjacent the edges 22 and 24 of the bathtub 10, ar sufficiently restrained by the adhesive 56 and the weight of the frame 60 and the heater 76. If needed, however, these edges could also be grooved and a corresponding lip 72 added to the frame 60.

Referring to FIGS. 2 and 3, a heater 76 is placed on top of the frame 60. The heater 76 should be portable and suitable for use in a bathroom, where most washbasins are found. Typical heaters used in commercial molding of comparable sized plastics are radiant heaters operating at temperatures on the order of 700°-800° F. The use of the large radiant heaters operating at such high temperatures typically has extremely high electrical power requirements, on the order of 3000-4000 watts. These high temperatures and power requirements preclude portability, and safe use in a bathroom environment. Further, these heaters are typically placed very close to the surface of the plastic, and on both sides of the plastic, in order to quickly heat the plastic to its pliable temperature, thereby allowing the largest number of plastic sheets to be molded in the shortest period of time. Simultaneous heating of both sides of the liner 50, is not practical in a bathroom environment. The portable heater 76 provides an advantageous solution to these problems.

Referring especially to FIG. 3, the heater 76 comprises a series of strip heaters 78 which in turn consist of strips or bars of metal having a high electrical resistance so that they heat up when an electrical current is applied to them. The size, spacing, and number of strip heaters 78 will vary according to the size of and shape of bathtub 10 and liner 50. For a bathtub 10 having a length of 60 inches and a cavity 12, 23 inches wide by 54 inches long by 13 inches deep, the use of nine (a) strip heaters 78 is believed suitable. In the preferred embodiment, these strip heaters 78 are 1.5 inches wide by 0.25 inches thick, by 54 inches long, and are spaced approximately 0.75 inches apart. Commercial strip heaters are typically 4 inches apart due to the higher temperature among other reasons. Strip heaters 78 can be obtained from Fast Heat Corporation. They are located within an insulated frame 80, (FIG. 3), which comprises a box-like structure having an open side adjacent the upper frame 64. These strip heaters 78 are located adjacent the upper frames 64.

The strip heaters 78 operate at 480 volts, 3.13 amps, and and draw 1500 watts of power, and operate at an average temperature of about 500° F. These values are far below the high power requirements for prior art units, especially when the distance between the heaters and the liner is considered.

An insulated sideboard 82 having a centrally located, thermally compatible window 84 (FIG. 3), can be connected to the externally accessible side of the frame 60. The resulting enclosure forms an effective oven 86 (FIG. 2), with the liner 50 forming the bottom, the walls 14 forming three sides, the heater 76 forming the top, and the sideboard 82 forming the remaining side. Further sideboards can be added, as needed, to form oven 86, in the event the walls 14 do not adequately enclose the frame 60.

The height of the vertical members 70 on the frame 60 determines the height of this effective oven 86. Members 70 having a length of about 12 inches are believed suitable. The cavity 12 in the bathtub 10 retains a portion of the heat generated by the oven 86, which heat is transferred through the liner 50. This retained heat serves to preheat the bathtub 10 and reduce the temperature differential between the bathtub 10 and the liner 50 during molding. This preheating of the bathtub 10 helps maintain the pliable state of the liner 50 during molding.

The heater 76 heats the liner 50 until it reaches a sufficiently pliable state for molding. The molding temperature of the oven 86 sufficient for molding of the liner 50 is about 325°-350° F. depending on the thickness of the liner 50. Since a short heating time is not as serious a concern as in a high volume manufacturing facility, the temperature in the oven 86 does not need to be substantially above the melting temperature of the liner 50.

The temperature in the oven 86 is sufficiently low so that the surface on the walls 14 (FIGS. 1 and 2) exposed to that temperature will not be damaged. Typically the walls 14 are covered by some sort of tile, which has more than sufficient thermal resistance to the temperatures of the oven 86. If required, however, any exposed surfaces can be easily insulated. Often, merely applying one or two layers of household aluminum foil will be sufficient thermal insulation. However, greater thermal insulation can be applied, and is commonly available and thus will not be described in detail.

Using a slow heating of the liner 50 from one side, especially with the heater 76 at a distance from the liner 50, does affect the proper heating of the liner 50 to its pliable, molding temperature. If the liner 50 is heated too slowly, then the plastic tends to dry out and burn. If the plastic is heated to an excessive temperature, then it will blister. It is preferable that virgin plastic be used.

The relatively slow heating of the liner 50 in the oven 86 also requires that the liner 50 be substantially free of entrained moisture. The ABS plastic will absorb moisture from the air over a period of time. This moisture will cause pitting and other surface irregularities during the heating process if not removed before heating. Thus, it is preferable to use a dry ABS plastic, or to ensure there is no moisture by preheating the liner 50 in a 120° oven for approximately ten (10) hours. The absorption of moisture does require time, and thus the preheating of the liner 50 to dry it out does not need to immediately precede the molding of the liner 50, although it is desirable to minimize the time lapse between the drying and molding.

The temperature of the oven 86 is controlled by a temperature probe 88 and a thermal sensitive switch 89. The probe 88 extends about 5 inches from, and is mounted to, the sideboard 82, at the level of the liner 50. The switch 89 shuts off the current to the heater 76 when a predetermined temperature is reached. That temperature is manually selected, and is adjustable. Suitable thermostats and control devices such as probe 88 and switch 89 are known in the art and not described in detail herein.

Using the above described apparatus, it has been found suitable to set the switch 89 to 225° F., and operate the heater 76 until the switch 89 shuts off. After waiting five minutes for the temperature of the liner 50 to equalize, the temperature is turned up to 280° F., which reactivates the heater 86. When the switch 89 shuts off the heater 76, three minutes are allowed to elapse. During this period, the temperature in the oven 86 continues to increase to about 325°-350° F. from the residual heat of the heaters 76. A visual inspection through window 84 is made to confirm the liner 50 is uniformly sagging downward, and thus sufficiently pliable and ready to mold. The vacuum is then drawn in the cavity 12 to mold the liner 50.

The strip heaters 78 are preferably located over the center of the upper frame 64, and the cavity 12. Thus, the heater 76 tends to direct most of its radiant energy towards that portion of the liner 50 over the center of the cavity 12. That central portion of the liner 50 is the part which must deform the most during vacuum molding, and therefore it needs to be the most pliable. Further, having the periphery of the liner 50 slightly cooler, and therefore less pliable than the center portion, also helps to restrain undesired deformation of the peripheral portion of the liner 50. The peripheral portion of the liner 50 is sufficiently pliable, however, to faithfully duplicate the surface and contour of the cavity 12 in the bathtub 10.

FIG. 2 shows the portable vacuum unit 90, which comprises a vacuum pump 92 mounted on a portable vacuum tank 94, and another, auxiliary tank 96. The vacuum pump 92 does not have sufficient suction capability in and of itself to satisfactorily mold the liner 50. Indeed, vacuum pumps used in industrial vacuum molding are so large, and require so much power, that they are immovable, and are nowhere sufficiently portable to be used in a bathroom environment. Industrial vacuum units typically have a 3-4 hp electric motor, and require 240/480 volts to operate.

To create a portable vacuum unit 90 with sufficient suction to form the liner 50, the auxiliary vacuum tank 96 is connected with the vacuum pump 92 and its tank 94. The vacuum tank 94 and 96 are preferably connected in series, with the vacuum pump 92 being placed on the last, or end tank 94.

The vacuum unit 90 is connected to the evacuation tube 44, and thus communicates with the cavity 12 in the bathtub 10. When the liner 50 has reached a sufficiently pliable state, the vacuum unit 90 is activated to create a vacuum within the cavity 12 and thereby mold the liner 50 to the contour of the bathtub 10. The window 84 (FIG. 3) allows visual inspection of the molding of the liner 50. In practice, the extent of the molding is readily determined, with the center portion of the bottom 34 being the first portion on the liner 50 which flattens out. Molding is complete when the corners adjacent the bottom 34 are discernable. At this point, the molded liner 50 is cooled as described at a later point.

The vacuum unit 90 draws a vacuum equivalent to 25 inches of mercury. For a bathtub 10 having approximately a 50 gallon capacity in cavity 12, a vacuum tank 94 in the range of 80-100 gallons is suitable. Thus, the capacity of the vacuum tank is approximately 1.5-2.0 times as large as the volume of water which can be held in the cavity 12 of the bathtub 10.

A larger vacuum pressure is believed to be suitable for use in molding the liner 50. The molding time using the 25 inches of mercury vacuum is approximately one minute, and is believed to provide acceptably molded liners 50. A faster molding rate, caused by an increased vacuum, is generally believed desirable since it would result in a more uniform molding, and would allow the molded liner 50 to be cooled before any thermal contraction problems arise. An extremely high vacuum, however, does run the risk of tearing the pliable plastic liner 50, or of exceeding the adhering capability of the adhesive 56.

A slower molding rate tends to increase the variability in the thickness of the molded liner 50. Further, the slower molding rate allows the liner 50 to cool, become less pliable, and thus not replicate the surface of the bathtub 10 with the maximum fidelity. A molding rate of ten minutes, with the above apparatus, has been tried, but did not result in a satisfactory molding.

The vacuum pump 92 and tanks 94 and 96 are commercially available, a unit being available with a 20 gallon tank from Barton Industrial. A series of several smaller capacity vacuum tanks can be connected in series to provide the required tank capacity. Common air compressor tanks can be used to form the vacuum tanks, the only change being that the valving must be altered for use with a vacuum, rather than pressurized air. Suitable valving can be obtained from Speedaire Corporation. It is believed, however, that standard steel pipe of 10-12 inches diameter can be used, with its ends being welded shut, and the valving added. The number and length of pipes can be varied to create the desired capacity. Since the tanks 94 and 96 are vacuum tanks, not positively pressurized tanks, there are minimal safety concerns with explosion, as rupture of vacuum tanks would cause implosion, not explosion.

Referring to FIGS. 2 and 3, after the liner 50 is molded, the sideboard 82 is removed, and cool air blown into the cavity 12 to rapidly set the molded liner 50. The air can be provided by the pump 92 (FIG. 2) on the vacuum unit 90, or by a portable auxiliary blower (not shown). The molded liner 50 is preferably set as soon as possible after the contour of the cavity 12 is completed. Delays in rapidly cooling the molded liner 50 can allow thermal contraction of all, or portions of the molded liner 50, and thus result in a nonoptimal fit between the liner 50 and the bathtub 10.

When the molded liner 50 is set, the heater 76, frame 60, and evacuation tube 44 are removed. Removal of the evacuation tube 44 is optional, however, since the tube can be cut flush with the surface of the side 16. If the evacuation tube 44 is left in place, it can provide an aperture through which a filler or adhesive can subsequently be forced into any gaps between the liner 50 and the bathtub 52, which may have developed during cooling.

Referring to FIG. 7, the hole 42 can then be plugged, and a concealing strip, such as a sideplate 92 can be placed along the lower surface of the bathtub 10 to conceal the holes 42. If desired, a standard baseboard 97 (FIG. 1) could be added. Similarly, the groove 54 (FIG. 1) can be covered with a molding, or preferably, covered with a caulking compound which is well known in the art. The placement of the groove 54 adjacent the edge of the liner 50 which abuts the interior wall 14, serves to facilitate the concealment of the groove 54 by this caulking.

Referring to FIG. 9, the drain 36 is reconnected as follows. The drain 36 typically comprises a circular flange 35 on a threaded, cylindrical portion 37. The flange 35 is forced against the bottom 34 of bathtub 10. The threaded portion 37 screws into the drainage pipes 39. After the liner 50 is molded, a hole can be opened in the bottom of the liner 50, over the drain 36. A drain 36b, with a smaller diameter of cylindrical portion 37b than the original drain 36, can then be inserted or threaded inside the existing drain and the flange 35b adhered to the liner 50. Preferably, the original drain 36 can be removed, typically by unscrewing it, before the liner 50 is molded. After molding, a hole can be formed in liner 50, and a replacement drain 36 screwed into place. If the original drain 36 is structurally sound, and the threaded cylindrical portion 37 is long enough to accommodate the thickness of the molded liner 50, then the original drain 36 could be reinserted.

The overflow 33 can be similarly reconnected. Preferably, an aperture coinciding with the overflow 33 can be cut in the molded liner 50, and a sealant or putty used to smooth any transition between the overflow 33 and the newly cut aperture in the liner 50. The previously used, removable sealant placed over overflow 33 would of course be removed.

Referring to FIGS. 1 and 8, there is shown an alternate embodiment of this invention wherein the adhesive 56 (FIG. 8) is placed on the bottom 34 of the bathtub 10 before molding. When the liner 50 is molded over these strips of adhesive 56, the liner will replicate the contour of the adhesive. If long, rectangular adhesive strips 92 (FIG. 1) are used, a raised surface will result in the bottom of the molded liner 50. This raised surface can be used as a safety device to prevent unintended slippage of a person standing on the bottom of the bathtub 10. The adhesive strips 92 are preferably arranged so as not to restrain the drainage of water from the bathtub 10.

Referring to FIGS. 1, 2, and 7, the depending lip 52 is shown as extending only partially down the side 16 of bathtub 10. After molding of the liner 50, a side plate 92 can be connected to the side 16 of the bathtub 10. The side plate 92 can be adhered to the side 16 by use of adhesives which are well known in the art and not described in detail. The juncture between the side plate 92 and the edge of the depending lip 52, can be aesthetically covered by using a joinder strip 95 which has an "H" shaped cross section such that the edge of the depending lip 52 fits into the top half of the "H", while the top edge of the side plate 92 fits into the bottom half of the "H".

Alternatively, the depending lip 52 can be formed on the liner 50 such that it extends the full length and depth of the side 16, down to the floor (not shown). In such cases, to accommodate bathtubs 10 having a variable height of side 16, it may be necessary to cut the extended depending lip 52 to the appropriate size. An appropriate aperture or hole 42 would also have to be made in the extended lip 52 so that the evacuation tube 44 could be used. The sealing of holes 42 would be as previously described. A baseboard 97 (FIG. 1) could be used to aesthetically cover the filled holes 42.

An alternate embodiment for restraining the periphery of the liner 50 during molding is shown in FIG. 13. A bracket 100 having an L-shaped cross section is placed adjacent the edge 20 of the bathtub 10. The bracket 100 has a generally vertical leg 102 which is substantially parallel to the wall 14. Joined to the vertical leg 102, is a substantially horizontal leg 104 which is generally parallel to the edge 20 of the bathtub 10. Depending from the horizontal leg 104, is a depending lip 106, which cooperates with groove 54 in liner 50 in order to restrain the periphery of the liner 50 as previously described. The lower frame 62 rests against the bracket 100, but is preferably not attached to the bracket 100.

Alternative embodiments of the molding apparatus are shown in FIGS. 10, 11, 12 and 14. Referring to FIG. 14, two end brackets 110 are located at opposite ends of bathtub 10. The end brackets 110 rest on the top or exterior surface of the liner 50, and provide the means to support a heat source 120 (described later) above the liner 50. The bottom or interior surface of the liner 50 faces the bathtub 10.

The end brackets 110 have a generally rectangular framework 114, which is substantially parallel with, and adjacent to, the walls 14 adjacent the ends of the bathtub 10. Two support legs 116 a and b are connected to the corners of the rectangular frame 114, which corners are adjacent the bathtub 10. The support legs 116 are generally perpendicular to the plane of the rectangular frame 114, and preferably extend about a foot or so along the length of the bathtub 10. The end bracket 110 can be made out of strap metal having cross sectional dimensions of $\frac{1}{4}''$ by 1''.

During molding of the liner 50, a holding bracket 130 is used to restrain the deformation of the peripheral edge of the liner 50 which is immediately adjacent the interior wall 14 and adjacent the bathtub edge 20 (FIG. 2). Additional holding brackets 131 and 133 are used to hold the edges of the liner 50 adjacent the ends of the bathtub 10 which adjoin the walls 14.

Referring to FIG. 12, the holding bracket 130 has a cross-sectional shape which is generally rectangular, with thelong side of the rectangle being generally parallel to, and adjacent to the wall 14. In the lower edge of the bracket 130 which is adjacent the liner 50, there is a depending projection 132, which projects into, and engages the walls of groove 54 in order to restrain the edge of the liner 50 as previously described. The projection 132, and the bracket 130, preferably run the length of the edge of bathtub 10 so as to provide a continuous restraint to the edge of the liner 50 via the groove 54.

The projection 132 can be formed integrally with the bracket 130, but in the preferred embodiment, there is a slot 134 (FIG. 10), having a generally rectangular cross-sectional shape, which is formed in the edge of the bracket 130 adjacent the liner 50. The depending projection 132 has a generally rectangular cross-sectional shape, at least one end of which corresponds in size and shape to that of the slot 134. The depending projection 132 can thus be inserted into the slot 134 so that the slot 134 holds and supports the depending projection 132.

In order to keep the holding bracket 130 from moving during molding, fasteners 136 secure the holding bracket 130 to the wall 14, or to the edge of the bathtub 10, but preferably to the bathtub 10. Preferably, the fasteners 136 comprise screws, which are drilled at an angle through the lower portion of the bracket 130, adjacent the liner 50, through the depending projection 132, through the edge of the liner 50, and then into the edge of the bathtub 10 underneath the wall 14. The fasteners 136 are preferably placed into predrilled holes, which are spaced about 6 to 8 inches apart. The fasteners 136 preferably removably fasten the holding bracket 130 to the wall 14, although it is possible that the connection be permanent.

The edges of the bathtub 10 typically extend underneath the outter surface of the adjoining wall 14 as shown in FIGS. 11-13. It is possible that the fasteners 136 can be attached to the wall 14 without passing through the bathtub 10. Typically, however, fastening directly to the walls 14 is undesirable since it damages the surface finish of the walls 14. Additionally, the walls 14 typically are of sheetrock or tile construction. Such construction is to fragile to provide support unless the fasteners 136 connect to a stud in the wall 14.

There is a depending flange 138 located adjacent the slot 134. The flange 138 extends away from the wall 14, generally parallel to the liner 50, and then extends downward at an angle toward the liner 50 and the projection 132. The flange 138 preferably runs the length of the bracket 130.

The edge of the flange 138 preferably rests against the exterior surface of the liner 50, and thus serves to stabilize the orientation of the bracket 130. The flange 138 is located between the groove 54 and the heat source 120 (FIG. 14). Thus during heating of the liner 50, the flange 138 serves as a heat shield to keep the liner 50 immediately surrounding the groove 54 cooler, and thus more rigid, than the remainder of the liner 50. Thus, the flange 138 provides a means of increasing the rigidity of the edge of the liner 50 during molding and helps prevent deformation of the periphery of the liner 50 during molding.

Immediately adjacent the depending flange 138, and preferably formed integrally therewith, is an upward extending flange 140. The flange 140 extends from the bracket 130 in a direction generally away from the wall 14, and then extends upward away from the projection 132. The flange 140 thus forms a channel 142 which extends along the length of the bracket 130.

The channel 142 provides a means for containing one edges of a thermal insulation blanket 144. The thermal insulation blanket 144 is placed between the walls 14 and the heat source 120 (FIG. 14), in order to insulate the surface of the walls 14 from thermal damage. Preferably, the thermal insulating blankets 144 are placed adjacent the walls 14.

The depending flange 138 and the flange 140, provide increased stiffness to the edge of the bracket 130 which restrains deformation of a portion of the periphery of the liner 50. The channel 142 formed by flange 140, also serves to trap moisture which condenses between the wall 14 and the thermal insulation blanket 144. If the condensed moisture runs onto the surface of the liner 50 during molding, the moisture will hinder uniform molding the liner 50, and cause unacceptable molding of, and an unacceptable surface finish on, the liner 50.

The edge of the bracket 130 opposite the slot 134 contains a cavity 146. The cavity 146 opens onto the side of the bracket 130 adjacent the wall 14. The cavity 146 contains an absorbent material, which is illustrated in FIG. 11 as two strands of cotton cord 148. The cavity 146 and the cord 148 run the length of the bracket 130. The cavity 146 and the cord 148 are cooperatively sized so that when the bracket 130 is installed, the cord 148 contacts the wall 14 along the length of the bracket 130. The cotton cord 148 absorbs any moisture which collects between the wall 14 and the thermal insulation blanket 144 and runs down to contact the cord 148. Thus the cavity 146, aided by the cord 148, provides moisture collecting means to trap the moisture that condenses between the wall 14 and the thermal insulation blanket 144 during molding.

The bracket 130 thus provides a means for restraining a peripheral portion of the liner 50 during molding, both by the projection 132, and cooling the edge of the liner 50 via the heat shield effect of the flange 138. The bracket 130 also provides a moisture barrier via the cavity 146, the cord 148, and the channel 142, to prevent condensed moisture from contacting the heated surface of the liner 50 during molding. The bracket 130 is also portable, and removably insertable via insertion and removal of the fasteners 136.

Referring to FIGS. 10 and 11, there is shown a modification of the bracket 130. The bracket 130 contains the same cavity 146, slot 134, depending flange 138, and upward extending flange 140, as previously described. In this modified embodiment, however, the slot 134 retains one or more depend projections 150. Further, the liner 50 does not have a groove 54 (FIG. 11). The depending projection 150 extends from the bracket 130 in the direction of the exterior surface of the liner 50. The projection 150 extends about the same distance from the edge of the bracket 130 as does the depending flange 138.

The edge of the depending projection 150 which contacts the liner 50 has an edge that is sufficient sharp to engage, rather than slide over, the exterior surface of liner 50. Preferably the projection 150 has a serrated edge 152. The depending projection 150 can comprise one or more saw blades, such as a hacksaw blade. Two such saw blades are illustrated. The serrated edge 152 is releasably embedded into the surface of the liner 50 so as to restrain the liner 50 during molding.

It is believed possible to use a knife edge rather than the serrated edge 152, however, a continuous sharp edge presents the possibility of scoring the surface of the liner 50 and causing the liner 50 to fracture along that score line. The use of the serrated edge 152, inhibits this scoring and fracture possibility and thus is preferred.

The edge of the depending projection 138 which contacts the liner 50, is generally formed such that it does not have a sufficiently sharp edge to embed into the surface of the liner 50 sufficiently to restrain sliding of the liner 50 during molding. It is believed possible, however, that the edge of the depending projection 138 could be sharpened so as to embed into the surface of the liner 50 and thereby restrain sliding of the liner 50 during molding.

Referring to FIG. 14, the overall assembly will be described. Adhesive 56 is placed on the surfaces of the bathtub 10 as previously described. A liner 50 is then placed on top of the bathtub 10 with the interior surface of the liner 50 adjacent the adhesive 56. The holding bracket 130 is then fastened to the edges of the bathtub 10, so as to restrain the periphery of the liner 50 during molding.

The bracket 130 is shown as being used along the longest interior surface of the bathtub 10. Brackets 131 and 133 are used on the shorter, ends of the bathtub 10 which also adjoin the wall 14 as shown in FIG. 4. The brackets 131 and 133 are constructed just as is bracket 130, and thus will not be redescribed. It is possible that the brackets 130, 131 and 133 will use one, or both of the projections 132 and 150. Preferably the brackets 130, 131 and 133 also provide containing means to prevent condensed moisture from dripping onto the surface of the liner 50 during molding.

The two end brackets 110 are placed on the liner 50. The thermal insulation blanket 144 is placed on the walls 14 where the heat is believed to be great enough to damage the surface of those walls 14. If a thermal blanket 144 is used, then a bracket with moisture retention means such as channel 142, and cavity 146, and cord 148, should also be used to prevent moisture from running onto the surface of the heated liner 50.

The heaters 120 are placed on top of, and supported by, the end brackets 110. The sideboard 82 is placed on the side of the bathtub 10 which is not enclosed by a wall 14. The liner 50 is then heated, a vacuum is drawn as previously described, and the liner 50 is molded. There is thus provided a means sufficiently portable so that one person can mold the liner 50 on a bathtub 10 using materials and equipment moveable, usable, and installable by that one person. The projection 150 engages the surface of liner 50 to prevent the engaged edge from sliding into the defile of cavity 12 (FIG. 3) during molding of the liner 50. The peripheral edge of the liner 50 is restrained from deformation without using a large compressive force as typically used in industrial molding presses which use pressure clamps to hold the edges of the molded material.

Referring to FIGS. 14 and 15, there is shown an alternate embodiment of the heat source 120. The heat source 120 (FIG. 14) comprises nine electrical resistance strip heaters 78 of the type previously described. The heating units 160, 162, and 164, are all connected to an electrical power source by means well known in the art and not described herein. For portability, the nine strip heaters 78, are contained in three separate heating units 160, 162, and 164, with each heating unit containing three strip heaters 78. One of the three strip heaters 178 contained in the center heating unit 162, is angled sideways toward the interior edge of the liner 50 which is restrained by the end bracket 110.

The preferred molding sequence using the heat source 120 and the end brackets 110, is as follows: the heat source 120 is turned on for seven minutes, off for five minutes, on for three minutes, off for three minutes, on for two minutes, off for two minutes, on for two minutes, off for three minutes, on for two minutes, and then turned off. At that time, visual inspection of the liner 50 through the window 84 (FIG. 14) is used to determine when to mold the liner 50 using vacuum means as previously described. Depending upon the climate, the ambient temperature, and the construction of the room in which the liner 50 is to be molded, additional heating time may be required.

If additional heat is required, it is applied about two minutes after the heat source 120 is shut off, and then is applied in two minutes intervals, with the heat source 120 being shut off for two minute intervals between the heating intervals. The correct time to mold is determined by visual inspection of the liner 50. When initially heated, the liner 50 bows upward toward the heat source 120. As the liner 50 becomes more pliable, portions of the liner 50 begin to sag downward toward the bathtub 10. When the liner 50 is uniformly sagging downwards towards the bathtub 10 as viewed through the window 84, the appropriate time to mold has arrived.

After molding, the liner 50 is allowed to set, the heat source 120 is removed as are the sideboard 82 and end brackets 110, and holding bracket 130.

The frame 60, the end brackets 110, and the heaters 76 and 120, are not heavy enough to restrain the edge of the liner 50 from undergoing underirable or deleterious deformation during heating and molding of the liner 50. Prior art molding devices used substantial clamping forces or heavy weights to maintain the peripheral shape of the liner 50 during molding. The force needed to mold a liner 50 sufficent to cover a washbasin such as a bathtub 10 are substantial due to the size and area of the liner to be molded, and due to the thickness of the liner 50. These heavy weights and forces would damage most washbasins or the adjacent walls and flooring for the installed washbasins. This damage was not of concern in prior devices since the molding was done in a factory enviroment, rather than an in situ enviroment. The frame 60 and heater 76, the brackets 110 and 130 and the heat source 120, weigh substantially less than the requisite clamping force used in prior art devices, and are suitable for in situ molding of washbasins.

While a preferred embodiment of the invention has been shown as described herein, there are numerous omissions, changes, and additions which may be made to this embodiment without departing from the spirit and scope of the invention. Thus, for example, a single sided adhesive 56 could be used to provide an airtight seal between the liner 50 and the bathtub 10 but not to adhere these two components. After molding, the molded liner 50 could be adhered to the bathtub 10. Further, the holding bracket 130 could be modified to engage the interior surface of the liner 50, in which case the flange 138, flange 140, channel 142, and cavity 146 could be omitted.

I claim:

1. An apparatus for in situ molding of a liner for a household bathtub, which liner substantially conforms to the exact shape of the bathtub comprising:
    a lightweight, portable frame having substantially the same horizontal size and shape as the top ledge of said bathtub;
    portable restraining means for releasably engaging at least one edge of said plastic liner on one surface of said liner to prevent any deleterious deformation of said sheet material during the molding procedure without requiring any heavy downward force between the liner material and the bathtub;
    portable oven means supported by said frame above said sheet for heating the exterior surface of said sheet of plastic liner material until said material reaches a sufficiently pliable state to be vacuum molded into the cavity defined between said sheet and said bathtub; and
    portable evacuation means communicating with said cavity for vacuum molding said pliable liner.

2. An apparatus as defined in claim 1, further comprising:
    cooling means for rapidly cooling said plastic liner after said liner has been molded.

3. An apparatus as defined in claim 2, wherein said cooling means comprises:
    means for blowing air into said bathtub.

4. An apparatus as defined in claim 1, further comprising:
    means for applying adhesive to adhere said liner to the periphery of said bathtub before said liner is molded.

5. An apparatus as defined in claim 1 wherein said plastic liner material contains a groove in its exterior surface adjacent the periphery of at least one edge of said liner, and wherein said portable restraining means comprises:

a depending lip on a portion of said frame coinciding withthe location of said groove, said depending lip cooperating with said groove to restrain the deformation of said peripheral edge of said liner during molding.

6. A molding apparatus as defined in claim 1, whrein said restraining means comprises:

a bracket attached to said bathtub adjacent a peripheral edge of said liner, said bracket having a projection which engages one surface of said liner adjacent said peripheral edge to restrain deformation of said peripheral edge of said liner during molding.

7. A molding apparatus as defined in claim 1, wherein said oven means further comprises heating elements for generating heat, and means for positioning at least one of said heating elements to direct more heat to at least one edge of said liner.

8. An apparatus as defined in claim 1, further comprising:

moisture collecting means to collect moisture which condenses during molding of said liner to prevent said moisture from deleteriously affecting the molding of said liner.

9. An apparatus for in situ molding of a liner for a washbasin used in a house or office, which liner substantially conforms to the exact shape of the washbasin, comprising:

a lightweight, portable frame having substantially the same horizontal size and shape as the top ledge of said washbasin;

portable restraining means for releasably engaging at least one edge of said plastic liner on one surface of said liner to prevent any deleterious deformation of said sheet material during the molding procedure without requiring any heavy downward force between the liner material and the washbasin;

portable heating means supported by said frame above said sheet for heating the exterior surface of said sheet of plastic liner material until said material reaches a sufficiently pliable state to be vacuum molded into the cavity defined between said sheet and said washbasin; and portable evacuation means communicating with said cavity for vacuum molding said pliable liner.

10. An apparatus as defined in claim 9, further comprising:

cooling means for rapidly cooling said plastic liner after it has been molded.

11. An apparatus as defined in claim 10, wherein said cooling means comprises:

means for blowing air into said washbasin.

12. An apparatus as defined in claim 9, further comprising:

means for applying adhesive to said liner to the periphery of said washbasin before said liner is molded.

13. An apparatus as defined in claim 9 wherein said plastic liner material contains a groove in its exterior surface adjacent the periphery of at least one edge of said liner, and wherein said portable restraining means comprises:

a depending lip on a portion of said frame coinciding with the location of said groove, said depending lip cooperating with said groove to restrain the deformation of said peripheral edge of said liner during molding.

14. A molding apparatus as defined in claim 9, wherein said restraining means comprises:

a bracket attached to said washbasin adjacent a peripheral edge of said liner, said bracket having a projection which engages the exterior surface of said liner adjacent said peripheral edge to restrain deformation of said peripheral edge of said liner during molding.

15. A molding apparatus as defined in claim 9, wherein said heating means further comprises heating elements with at least one of said heating elements being positionable so as to apply more heat to at least one edge of said liner.

16. An apparatus as defined in claim 9 wherein said plastic liner material contains a groove in its exterior surface, said groove being located adjacent said portion of said washbasin adjoining said wall, and wherein said portable restraining means comprises:

a longitudinal member having a projection along one edge of said member, said projection extending for a distance substantially the length of said groove, said projection adapted to engage said groove so that the deformation of said liner adjacent said groove corresponds to the deformation of said projection on said member; and fastening means to fasten said member to a peripheral edge of one of said wall or said washbasin during molding of said liner so as to restrain deformation of said projection and said groove during molding.

17. An apparatus as defined in claim 9, wherein said washbasin has at least one edge adjacent a wall, wherein aid portable restraining means further comprises:

a bracket adapted to be fastened to one of said washbasin or wall, said bracket having a projection which engages the surface of said liner adjacent said adjacent wall, the engagement of said projection and liner being sufficient to restrain deleterious deformation of said liner during molding.

18. An apparatus as defined in claim 17, wherein said projection has a serrated edge in contact with the exterior surface of said liner.

19. An apparatus as defined in claim 18, wherein said bracket further comprises:

moisture collecting means adapted to contact said wall adjacent said bracket, to collect moisture which condenses during modling of said liner.

20. An apparatus as defined in claim 9, further comprising:

moisture collecting means to collect moisture which condenses during molding of said liner to prevent said moisture from deleteriously affecting the molding of said liner.

* * * * *